United States Patent [19]
Gibson et al.

[11] 4,076,893
[45] Feb. 28, 1978

[54] TRIBO MODIFIED CARRIER MATERIALS VIA ACYLATION

[75] Inventors: Harry W. Gibson, Penfield; Frank C. Bailey, Webster, both of N.Y.; Joseph L. Mincer, Lewisville, Tex.

[73] Assignee: Xerox Corporation, Stamford, Conn.

[21] Appl. No.: 500,772

[22] Filed: Aug. 26, 1974

[51] Int. Cl.[2] ........................ B32B 27/14; G03G 9/10
[52] U.S. Cl. .............................. 428/407; 252/62.1 P; 427/221; 526/49; 526/53; 526/56
[58] Field of Search .................. 117/17, 5, 26, 27, 28, 117/100 A, 100 B, 100 M, 100 C, 100 S, 124 E, 126 GB; 252/62.1 P; 260/37 R, 37 M, 37 N, 39 M, 42.14, 42.16, 42.22, 42.26, 42.52; 428/403, 404, 406, 407; 427/14, 20, 18, 216, 220, 22; 526/49, 53, 56

[56] References Cited

U.S. PATENT DOCUMENTS

| | | | |
|---|---|---|---|
| 3,198,647 | 8/1965 | Kress | 117/100 A |
| 3,203,825 | 8/1965 | Stevens | 117/100 A |
| 3,544,507 | 12/1970 | Lloyd | 428/407 X |
| 3,725,111 | 4/1973 | Horvath et al. | 117/100 S |
| 3,795,618 | 3/1974 | Kasper | 117/100 M |
| 3,811,880 | 5/1974 | Browning | 252/62.1 X |
| 3,817,777 | 6/1974 | Horvath et al. | 117/100 S |

*Primary Examiner*—Harry J. Gwinnell
*Assistant Examiner*—Stuart D. Frenkel

[57] ABSTRACT

Electrostatographic developer compositions for use in developing electrostatic latent images wherein the triboelectric charging potential of functional polymers employed in the carrier materials are controlled through chemical alteration by acylation of hydroxyl and amino functions. The controlled variation of the triboelectric behavior of functional polymers by acylation provides a means of attaining optimum triboelectric responses in development systems.

6 Claims, No Drawings

TRIBO MODIFIED CARRIER MATERIALS VIA ACYLATION

BACKGROUND OF THE INVENTION

This invention relates in general to imaging systems and more particularly to improved electrostatographic developer mixtures for use in such systems.

The formation and development of images on the surface of photoconductive materials by electrostatographic means is known. The basic electrostatographic process, as taught by C. F. Carlson in U.S. Pat. No. 2,297,691, involves placing a uniform electrostatic charge on a photoconductive insulating layer, exposing the layer to a light and shadow image to dissipate the charge on the areas of the layer exposed to the light, and developing the resultant electrostatic latent image by depositing on the image a finely-divided electroscopic material referred to in the art as "toner". The toner is attracted to those areas of the layer which retain a charge, thereby forming a toner image corresponding to the electrostatic latent image. This "powder" image may then be transferred, usually electrostatically, to a support surface such as paper. The transferred image may subsequently be permanently affixed to a support surface by heat or other suitable affixing means, such as solvent or overcoating treatment may be used instead.

Many methods are known for applying the electroscopic particles to the latent image to be developed. One development method, as disclosed by E. N. Wise in U.S. Pat. No. 2,618,582, is known as "cascade" development. In this method, developer material comprising relatively large carrier particles having finely-divided toner particles electrostatically clinging to the surface of the carrier particles is conveyed to and rolled or cascaded across the surface bearing the electrostatic latent image. The charged portions of the surface have a charge of the same polarity as, but stronger than, the carrier particles. Toner and carrier particles having opposite polarities are selected so that the toner particles cling to the carrier particles. In order to develop a negatively charged elecstatic latent image, a toner and carrier combination are selected in which the toner is triboelectrically positive in relation to the toner. Conversely, to develop a positively charged electrostatic latent image, a toner and carrier combination wherein the toner is triboelectrically negative in relation to the carrier is used. The triboelectric relationship between the toner and carrier depends on the relative positions of the materials in the "triboelectric series". In this series, materials are arranged in ascending order of their ability to take on a positive charge. Each material is positive with respect to any material classified below it in the series; and, negative with respect to any material above it in the series. As the developer mixture cascades or rolls across the image-bearing surface, the toner particles are electrostatically attracted from the carrier to the charged portions of the image-bearing surface, whereas they are not electrostatically attracted to the uncharged or background portions of the image which they contact. The carrier particles and unused toner particles are then recycled. The cascade development process is extremely good for the development of line copy images, and is the most widely used commercial electrostatographic development technique. A general purpose office copying machine incorporating this technique is described in U.S. Pat. No. 3,099,943.

Another technique for developing electrostatic latent images is the "magnetic brush" process as disclosed for example, in U.S. Pat. No. 2,874,063. In this process, a developer material containing toner and magnetic carrier particles is attracted to and is carried by a magnet. The magnetic field causes alignment of the magnetic particles in a brush-like configuration when this magnetic brush is brought into contact with an electrostatic latent image-bearing surface, the toner particles are attracted from the carrier particles of the brush to the charged areas of the image-bearing surface but not to the uncharged areas. Since the charged areas have an imagewise configuration, the toner material clings to the surface in imagewise configuration, thus developing the latent image.

Another method for developing electrostatic latent images is disclosed in U.S. Pat. No. 3,503,776 issued to R. W. Gundlach. In this method, images are formed by transporting an electrostatic latent image-bearing surface in a generally ascending arcuate path, and contacting only the image in a contact zone with a bath of developer material transported in a concave chamber adjacent the lower path of the imaging surface. The contact zone extends from about the lowermost point of the arcuate path to the uppermost point of the arcuate path. As the imaging surface is transported along its arcuate path, frictional contact between the developer and the imaging surface in the contact zone circulates the developer in the bath and brings developer material into developing configuration with the imaged surface.

Many other methods, such as the "touchdown" development method disclosed by C. R. Mayo in U.S. Pat. No. 2,895,847, are known for applying electroscopic particles to the electrostatic latent image to be developed. The development process, as described above, together with numerous modifications, are well-known to the art through various patents and publications and through the widespread availability and utilization of electrostatographic imaging equipment.

In automatic reproduction equipment, it is conventional to employ as the imaging plate a photoconductor on a conductive substrate in the form of a cylindrical drum or a flexible belt which is continuously rotated through a cycle of sequential operations including charging, exposing, developing, transferring and cleaning. The developer chamber is charged with a developer mixture comprising carrier particles and enough toner particles for hundreds of reproduction cycles. Generally, the freshly charged developer mixtures contain between about 1.5 and 5% toner particles based upon the weight of the developer. This initial concentration provides sufficient toner for many reproduction cycles without causing undesirably high background toner deposition.

While ordinarily capable of producing good quality images, conventional developing systems suffer serious deficiencies in certain areas. In the reproduction of high contrast copies such as letters, tracings and the like, it is desirable to select the electroscopic powder and carrier materials so that their mutual electrification is relatively large; the degree of such electrification being governed in most cases by the distance between their relative positions in the triboelectric series. However, when otherwise compatible electroscopic powder and carrier materials are removed from each other in the triboelectric series by too great a distance, the resulting images are very faint because the attractive forces between the carrier and toner particles compete with the attractive forces between the electrostatic latent image and the toner particles. Although the image density described in the immediately preceding sentence may be improved by increasing toner concentration in the developer mixture, undesirably high background toner deposition as well as increased toner impaction and agglomeration is encountered when the developer mixture is over-toned. The initial electrostatographic plate charge may be increased to improve the density of the deposited powder image, but the plate charge would ordinarily have to be excessively high in order to attract the electroscopic powder away from the carrier particles. Excessively high electrostatographic plate charges are not only undesirable because of the high power consumption necessary to maintain the electrostatographic plate at high potentials, but also because the high potential causes the carrier particles to adhere to the electrostatographic plate surface rather than merely roll across and off the electrostatographic plate surface. Print deletion and massive carry-over of carrier particles often occur when carrier particles adhere to reusable electrostatographic imaging surfaces. Massive carrier carry-over problems are particularly acute when the developer is employed in solid area coverage machines where excessive quantities of toner particles are removed from carrier particles thereby leaving many carrier particles substantially bare of toner particles. Further, adherence of carrier particles to reusable electrostatographic imaging surfaces promotes the formation of undesirable scratches on the surfaces during image transfer and surface cleaning operations. It is, therefore, apparent that many materials which otherwise have suitable properties for employment as carrier particles are unsuitable because they possess too high a triboelectric value. In addition, uniform triboelectric surface characteristics of many carrier surfaces are difficult to achieve with mass production techniques. Quality images are, in some instances, almost impossible to obtain in high speed automatic machines when carriers having non-uniform triboelectric properties are employed. Although it may be possible to alter the triboelectric value of an insulating carrier material by blending the carrier material with another insulating material having a triboelectric value from the triboelectric value of the original carrier material, relatively larger quantities of additional material are necessary to alter the triboelectric value of the original carrier material. The addition of large quantities of material to the original carrier material to change the triboelectric properties thereof requires a major manufacturing operation and often undesirably alters the original physical characteristics of the carrier material. Further, it is highly desirable to control the triboelectric properties of carrier surfaces to accommodate the use of desirable toner compositions while retaining the other desirable physical characteristics of the carrier. The alteration of the triboelectric properties of a carrier by applying a surface coating thereon is a particularly desirable technique. With this technique, not only is it possible to control the triboelectric properties of a carrier made from materials having desirable physical characteristics, it is also possible to employ materials previously not suitable as a carrier. Thus, for example, a carrier having desirable physical properties with the exception of hardness, can be coated with a material having desirable hardness as well as other physical properties, rendering the resultant product more useful as a carrier. However, since most carrier coating materials are deficient in one or more of the above areas, there is a continuing need for improved electrostatographic carrier and developer compositions and methods for forming the same.

It is, therefore, an object of this invention to provide carrier compositions and a method for their preparation which overcome the above-noted deficiencies.

It is another object of this invention to provide a method for controllably altering the triboelectric values of carrier materials without markedly changing the physical and chemical properties of the original carrier material.

It is a further object of this invention to provide carrier material manufacturing techniques for producing developer materials having finely-adjusted triboelectric properties.

It is a further object of this invention to render suitable as carrier coating materials many polymeric materials which were heretofore unsuitable as carrier coating materials.

It is another object of this invention to provide carrier and developer materials having triboelectric properties which are superior to known carrier and developer materials.

A still further object of this invention is to provide improved developer materials having physical and chemical properties superior to those of known developer materials.

The foregoing objects and others are accomplished generally speaking, by the controlled chemical alteration of the triboelectric charging potential of functional polymers employed as carrier coating materials. The controlled variation of the triboelectric behavior of functional polymers provides a means of attaining optimum triboelectric responses of electrostatographic developer materials for specifically defined applications. Thus, in accordance with this invention, monomeric and/or polymeric materials are systematically chemically modified to provide structural effects which yield structure-triboelectric property relationships between amines, amides, alcohols, esters, and urethanes. These relationships have been found to be extremely helpful in designing new carrier materials. By this invention, the triboelectric charging properties of toner-carrier pairs are controlled to enable optimum triboelectric relationships in developer compositions.

It is to be noted that, by itself, no material has a triboelectric charge. The magnitude of a triboelectric charge depends upon both the toner and the carrier material. Thus, replacement of one of the components to optimize triboelectric charging properties is generally necessary to provide the desired triboelectric response. By so doing, greater latitude is available for specific electrostatographic applications. In accordance with this invention, it has been found that by varying the degree of chemical modification of polymeric materials for use as carrier coating materials, either stoichiometrically or kinetically, the triboelectric properties of developer materials can be controlled in a continuous manner.

In electrostatographic development of selenium photoconductor latent images, polymers which tend to take on a relatively high positive charge are generally satisfactory for use as carrier coating materials; in electrostatographic development of other photoconductor latent images, for example, zinc oxide, phthalocyanine, cadmium sulfide, polyvinylcarbazole-trinitroflurenone, polymers which tend to acquire relatively high negative charges are generally satisfactory for use as carrier coating materials. In accordance with this invention, the triboelectric properties of developer materials are correlated with their structural composition and thereby predictably controlled. Since the distance between a given toner-carrier pair on a triboelectric charging scale determines the triboelectric charge between them, their relative positions determine the sign of the triboelectric charge. Those materials low on the scale prefer to adopt a positive charge and those materials high on the scale prefer to adopt a negative charge. Appropriate toner-carrier pairs can be selected based on their triboelectric charging or triboelectric series relationship to satisfy a particular acceptable triboelectric charging range requirement for a given electrostatographic machine developer housing.

It has been found that triboelectric behavior is a function of molecular structure which now allows the controlled and progressive modification of the triboelectric charging properties of carrier compositions so as to obtain optimum triboelectric charging properties between toner and carrier pairs. Thus, by this invention, adjustment of the triboelectric charging properties of electrostatographic developer materials need not be in stepwise fashion but may be accomplished in a continuous manner providing a high degree of "fine tuning" of triboelectric properties for developer materials.

In accordance with this invention, the triboelectric charging properties of monomeric and polymeric compounds may be modified by systematic chemical modification by means of acylation of hydroxy — or amino — containing monomers and polymers. Cascade development triboelectric charging evaluations of such acylated monomers and polymers have demonstrated that these materials charge more negatively than the starting materials.

It has been found that reaction of the pendant hydroxyl or amino moieties of monomers, polymers, or copolymers with an acylating agent provides a means of continuous control of the triboelectric properties of such materials. More specifically, as the degree of acylation increases, the capacity for negative triboelectric charging of such monomers, polymers and copolymers increases. The degree of acylation may be controlled either kinetically or stoichiometrically enabling the desired conversion. Furthermore, various types of acylating agents which are reactive toward hydroxyl and amino function may be employed.

Thus, in accordance with this invention, the triboelectric properties of monomers, polymers, and copolymers may be continuously controllably varied by means of controlling the amount and type of acylating agent. It has also been found that the crosslinking of hydroxy or amino functionalized polymers via reaction of the pendant hydroxyl or amino moieties with a crosslinking agent such as a diisocyanate provides a further means of continuous control of the triboelectric properties of the polymer. Various types of crosslinking agents which are reactive toward hydroxyl or amino functions may be employed. In addition, it is not necessary for the polymer material to be crosslinked to observe a change in its triboelectric charging properties since the change in triboelectric charging is not due to molecular weight change.

Thus where polymer materials have satisfactory properties for electrostatographic use it is highly desirable to be able to alter and control their triboelectric properties as carrier materials. For example, hydroxy or amino functionalized polymers such as styrene-alkyl methacrylate copolymers may be prepared to possess the desired triboelectric response when mixed with any given conventional toner material thus enabling the "fine-tuning" of the triboelectric properties of the developer combination.

In addition to these transformations, functionalized polymers may be further derivatized. For example, an aminolyzed polymer having the general structure

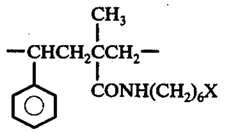

where X may be $NH_2$, OH, $NHCOC_6H_4R$, $OCOC_6H_4R$, or H provides polymer compositions of varying triboelectric charging potential. More specifically, conversion of the $NH_2$ group to a benzamide ($X=NHCOC_6H_4R$) causes the polymer to accept more negative charge. The nitro substituent (R) causes more negative charging than does methoxy (R). Likewise, conversion of the OH group to $OCOC_6H_4R$ also allows the polymer to accept more negative charge. The effect of masking hydroxyl functions may also be obtained by providing polymers containing blocked diisocyanates. Upon conversion from free hydroxyl to the urethane upon deblocking (thermal liberation) of the diisocyanate, the triboelectric charge on the polymeric material is more negative. Further, ethyl cellulose, treated with phenyl isocyanate to effect conversion of hydroxyl moieties to urethane functions is found to decrease its capacity for positive charging.

It is also noted that the triboelectric charging capacity is controlled by the substituent R of the benzamides ($X=NHCOC_6H_4R$) and benzoates ($X=OCOC_6H_4R$). The propensity for negative charging increases with increasing electron withdrawing power of R as measured by substituent constants in each case.

The chemical modification of such materials enables the alteration of materials having optimum physical properties in such a way as to improve their triboelectric properties for electrostatographic use. This invention may serve as a guide for the preparation of carrier compositions having "finely-tuned" triboelectric charging properties, and the capacity for continuous control of such properties through variation in extent of reaction may be employed for such purpose.

In regard to triboelectric response, it is to be noted that materials such as those derived by aminolysis of styrene-methacrylate copolymers provide excellent carrier coatings, especially in view of their crosslinkability. By the use of such materials, toners that previously provided unacceptable triboelectric response with conventional carriers now function properly. Thus, the coating of carrier cores, for example, metallic beads, with functionalized polymers containing a crosslinking agent provides a carrier material which in addition to improved toughness, the triboelectric properties thereof may be continuously varied by means of controlling the amount of the crosslinking agent in the coating composition.

The coating of metallic carriers with hydroxy or amino functionalized polymers and crosslinking these materials via reaction of the pendant hydroxyl or amino moieties with a crosslinking agent such as diisocyanate provides a means of continuous control of the triboelectric properties of the coated carriers. It has been found that as the degree of conversion increases, the capacity for positive triboelectric charging decreases. In addition, the degree of conversion can be controlled stoichiometrically. Further, various types of crosslinking agents which are reactive toward hydroxyl or amino functions may be employed. In addition, various hydroxyl or amino containing polymers exhibit similar effects. It is to be noted that it is not necessary for the polymer material to be crosslinked to observe a change in the triboelectric charging properties since the change in triboelectric charging is not due to molecular weight change. Monofunctional reagents have been found to bring about similar changes.

Any suitable carrier coating material may be chemically modified in accordance with this invention to control the triboelectric properties of the coated carrier. Typical carrier coating materials include styrene-acrylate-organosilicon terpolymers, polyvinyls such as polyvinyl alcohol and polyvinyl butyral, thermosetting resins including phenolic resins such as phenol-formaldehyde, phenol-furfural and resorcinol formaldehyde; amino resins such as urea-formaldehyde and melamineformaldehyde; epoxy resins; and the like. Many of the foregoing and other typical carrier coating materials are described by L. E. Walkup in U.S. Pat. No. 2,618,551; B. B. Jacknow et al in U.S. Pat. No. 3,526,533; and R. J. Hagenbach et al in U.S. Pat. Nos. 3,533,835 and 3,658,500.

Any suitable electrostatographic carrier coating thickness may be employed. However, a carrier coating having a thickness at least sufficient to form a thin continuous film on the carrier particle is preferred because the carrier coating will then possess sufficient thickness to resist abrasion and prevent pinholes which adversely affect the triboelectric properties of the coated carrier particles. Generally, for cascade and magnetic brush development, the carrier coating may comprise from about 0.1 percent to about 10.0 percent by weight based on the weight of the coated carrier particles. Preferably, the carrier coating should comprise from about 0.1 percent to about 1.0 percent by weight based on the weight of the coated carrier particles because maximum durability, toner impaction resistance, and copy quality are achieved. To achieve further variation in the properties of the coated carrier particles, well-known additives such as plasticizers, reactive and non-reactive polymers, dyes, pigments, wetting agents and mixtures thereof may be mixed with the coating materials. An ultimate coated carrier particle having an average diameter between about 50 microns and about 1,000 microns is preferred in cascade systems because the carrier particle then possesses sufficient density and inertia to avoid adherence to the electrostatic image during the cascade development process. Adherence of carrier particles to an electrostatographic drum is undesirable because of the formation of deep scratches on the drum surface during the image transfer and drum cleaning steps, particularly where cleaning is accomplished by a web cleaner such as the web disclosed by W. P. Graff, Jr., et al in U.S. Pat. No. 3,186,838.

Any suitable well known coated or uncoated electrostatographic carrier bead material may be employed as the core of the beads of this invention. Typical carrier core materials include sodium chloride, ammonium chloride, aluminum potassium chloride, Rochelle salt, sodium nitrate, potassium chlorate, granular zircon, granular silicon, glass, silicon dioxide, flintshot, iron, steel, ferrite, nickel, Carborundum, and mixtures thereof.

Any suitable well-known toner material may be employed with the coated carriers of this invention. Typical toner materials include gum copal, gum sandarac, rosin, cumaroneindene resin, asphaltum, gilsonite, phenolformaldehyde resins, rosin modified phenolformaldehyde resins, methacrylic resins, polystyrene resins, polypropylene resins, epoxy resins, polyethylene resins, polyester resins, and mixtures thereof. The particular toner material to be employed obviously depends upon the separation of the toner particles from the coated carrier in the triboelectric series and should be sufficient to cause the toner particles to electrostatically cling to the carrier surface. Among the patents describing electroscopic toner compositions are U.S. Pat. No. 2,659,670 to Copley; U.S. Pat. No. 2,753,308 to Landrigan; U.S. Pat. No. 3,079,342 to Insalaco; U.S. Pat. Reissue 25,136 to Carlson and U.S. Pat. No. 2,788,288 to Rheinfrank et al. These toners generally have an average particle diameter between about 1 and 30 microns.

Any suitable colorant such as a pigment or dye may be employed to color the toner particles. Toner colorants are well known and include, for example, carbon black, nigrosine dye, aniline blue, Calco Oil Blue, chrome yellow, ultramarine blue, Quinoline Yellow, methylene blue chloride, Monastral Blue, Malachite Green Ozalate, lampblack, Rose Bengal, Monastral Red, Sudan Black BM, and mixtures thereof. The pigment or dye should be present in the toner in quantity sufficient to render it highly colored so that it will form a clearly visible image on a recording member. Preferably, the pigment is employed in an amount from about 3 percent to about 20 percent, by weight, based on the total weight of the colored toner because high quality images are obtained. If the toner colorant employed is a dye, substantially small quantities of colorant may be used. Any suitable conventional toner concentration may be employed with the coated carriers of this invention. Typical toner concentrations for cascade and magnetic brush development systems include about 1 part toner with about 10 to about 200 parts by weight of carrier.

Any suitable organic or inorganic photoconductive material may be employed as the recording surface with the coated carriers of this invention. Typical inorganic photoconductor materials include: sulfur, selenium, zinc sulfide, zinc oxide, zinc cadmium sulfide, zinc magnesium oxide, cadmium selenide, zinc silicate, calcium strontium sulfide, cadmium sulfide, mercuric iodide, mercuric oxide, mercuric sulfide, indium trisulfide, gallium selenide, arsenic disulfide, arsenic trisulfide, arsenic triselenide, antimony trisulfide, cadmium sulfoselenide, and mixtures thereof. Typical organic photoconductors include: quinacridone pigments, phthalocyanine pigments, triphenylamine, 2,4-bis(4,4'-diethylaminophenol)-1,3,4-oxadiazol, N-isopropylcarbazol, triphenylpyrrol, 4,5-diphenylimidazolidinone, 4,5-diphenylimidazolidinethione, 4,5-bis(4'-aminophenyl)imidazolidinone, 1,5-dicyanonaphthalene, 1,4-dicyanonaphthalene, aminophthalodinitrile, nitrophthalodinitrile, 1,2,5,6-tetraazacylooctatetraene-(2,4,6,8), 2-mercaptobenzothiazole-2-phenyl-4-diphenylideneoxazolone, 6-hydroxy-2, 3-di(p-methoxyphenyl)benzofurane, 4-dimethylaminobenzylidenebenzhydrazide, 3-benzylideneaminocarbazole, polyvinyl carbazole, (2-nitrobenzylidene)-p-bromoaniline, 2,4-diphenylquinazoline, 1,2,4-triazine, 1,5-diphenyl-3-methylpyrazoline, 2-(4'-dimethylamino phenyl)benzoxazole, 3-amine-carbazole, and mixtures thereof. Representative patents in which photoconductive materials are disclosed include U.S. Pat. Nos. 2,803,542 to Ullrich, U.S. Pat. No. 2,970,906 to Bixby, U.S. Pat. No. 3,121,006 to Middleton, U.S. Pat. No. 3,121,007 to Middleton, and U.S. Pat. No. 3,151,982 to Corrsin.

The surprisingly better results obtained with the electrostatographic coated carriers of this invention may be due to many factors. For example, the coated carriers of this invention possess smooth outer surfaces which are highly resistant to cracking, chipping, and flaking. In cascade development systems, the smooth surface enhances the rolling action of the carrier particles across the electrostatographic surfaces and reduces the tendency of carrier particles to adhere to the electrostatographic imaging surfaces. When these coated carriers are employed in electrostatographic development systems, carrier life is unexpectedly extended particularly with respect to toner impaction resistance. Additionally, the carrier coating materials of this invention appear to contribute to the stability of the triboelectric properties of the coated carrier over a wide relative humidity range. Because of their triboelectric properties, these carrier materials may be employed in reversal development of positively charged images. Further, the coated carriers of this invention provide more uniform triboelectric characteristics than current carriers when employed in electrostatographic development systems. In addition, the coated carriers of this invention provide exceptionally good life performance, durability, copy quality, quality maintenance, less carrier bead sticking and agglomeration, and also provide improved abrasion resistance thereby minimizing carrier chipping and flaking. Further, the coated carriers of this invention provide triboelectric values such that they can be used with a wide variety of presently available toners in present electrostatographic processes, and retain a pedictable triboelectric value. Thus the improved coated carrier particles of this invention have desirable properties which permit their wide use in presently available electrostatographic systems.

DESCRIPTION OF PREFERRED EMBODIMENTS

The following examples, other than the control examples, further define, describe and compare preferred methods of utilizing the coated carriers of the present invention in electrostatographic applications. Parts and percentages are by weight unless otherwise indicated.

In the following, the relative triboelectric values generated by contact of carrier beads with toner particles is measured by means of a cascade device, the device comprises a grounded metal plate set at an arbitrary but constant angle of elevation to horizontal, for example, 30°, and a cup at the bottom of the incline. The cup is not attached to the incline and is thus not grounded; it is attached to an electrometer. The material to be tested is coated onto a metallic sheet, such as aluminum, and this is attached to the incline. Then beads of the desired carrier material are cascaded down the film and into the electrometer cup, where the charge acquired by the beads is measured. From this quantity and the weight of the beads the charge to mass ratio is calculated. This quantity is a direct measure of the triboelectric charging capacity of the polymeric film. The measurement is done at constant relative humidity and temperature. Since triboelectric measurements are relative, the measurements should, for comparative purposes, be conducted under substantially identical conditions.

EXAMPLE I

A polymer was prepared by ester group aminolysis of a styrene-n-butyl methacrylate copolymer (2.54:1.00 mole ratio) with an aminoalcohol resulting in formation of hydroxyalkylamide functions. Thus, a mixture of about 117.5 grams (0.289 mole of ester functions based on elemental analysis) of the styrene-n-butyl methacrylate, about 41.0 grams (0.350 mole) of 6-aminohexanol, and about 39.3 grams (0.350 mole) of 1,4-diazabicyclo (2,2,2) octane was stirred under dry nitrogen at about 180° C (oil bath temperature 205° C) using an ambient air-cooled condenser to allow escape of the n-butanol produced. The polymer was aminolyzed to the extent of about 25 mole percent. The polymer was purified by dissolving in tetrahydrofuran and then 10% HCl was added. The liquid phase was decanted from the gummy polymer. This procedure was repeated twice, followed by a fourth and fifth wash using 5% methanolic HCl. The polymer was taken up in tetrahydrofuran and precipitated by dropwise addition with rapid stirring to 10% HCl. After homogenization in a blender and filtration, the process was repeated. The polymer in tetrahydrofuran solution was then precipitated in like manner from deionized water, and this process repeated. After a final precipitation from methanol, the polymer was dried in vacuo. Generally, the polymer sample was dissolved in about five times its weight of tetrahydrofuran. Volumes of the precipitating solutions were 6-10 times those of the polymertetrahydrofuran solution.

Films were cast from solutions onto aluminum plates and thoroughly dried. The cascade triboelectric charging properties obtained using these films when using 250 micron nickel beads as carrier are given in Table I.

EXAMPLE II

To a stirred solution of about 10.0 grams of the hydroxy polymer of Example I in about 30 ml. of dry pyridine was added a solution of about 5.0 grams of substituted benzoyl chloride in dry pyridine. The solution was refluxed about 18 hours and then poured into about 400.0 ml of 10% by volume HCl. After homogenization in a blender with 10% by volume HCl, then saturated sodium bicarbonate solution, and then water, the polymer was dissolved in tetrahydrofuran and precipitated into 10% by volume HCl. In like manner, the polymer was successively precipitated from saturated sodium bicarbonate twice, methanol and water thrice. In this way, the following p-substituted benzoate esters were prepared: $NO_2$ (60%), $OCH_3$ (85%), Cl (100%), H (90%). The degree of conversions was determined by elemental analysis.

Films were cast from solution onto aluminum plates and thoroughly dried. The cascade triboelectric charging properties obtained using these films when using 250 micron nickel beads as carrier are given in Table I.

EXAMPLE III

Functionalized polymers were prepared by ester group aminolysis of a styrene-n-butyl methacrylate copolymer (2.54:1.00 mole ratio). A mixture of about 117.5 grams (0.289 mole of ester functions based on elemental analysis) of the styrene-n-butyl methacrylate, about 41.0 grams of 1,6 hexanediamine and about 39.3 grams (0.350 mole) of 1,4-diazabicyclo(2,2,2)octane was stirred under dry nitrogen at about 180° C (oil bath temperature 205° C) using an ambient air-cooled condenser to allow escape of the butanol produced. Samples were removed periodically, quenched in 10% HCl by weight, and purified as in Example I.

Films were cast from solution onto aluminum plates and thoroughly dried. The cascade triboelectric charging properties obtained using these films when using 250 micron nickel beads as carrier are given in Table I.

EXAMPLE IV

To a stirred solution of about 10.0 grams of the amino polymer of Example III in about 30 ml. of dry pyridine was added a solution of about 5.0 grams of substituted benzoyl chloride in dry pyridine. The solution was refluxed about 18 hours and then poured into about 400.0 ml of 10% by volume HCl. After homogenization in a blender with 10% by volume HCl, then saturated sodium bicarbonate solution, and then water, the polymer was dissolved in tetrahydrofuran and precipitated into 10% by volume HCl. In like manner, the polymer was successively precipitated from saturated sodium bicarbonate twice, methanol and water thrice. In this way, the following p-substituted benzamides were prepared: $NO_2$ (100%), $OCH_3$ (100%). The degree of conversions was determined by elemental analysis.

Films were cast from solution onto aluminum plates and thoroughly dried. The cascade triboelectric charging properties obtained using these films when using micron nickel beads as carrier are given in Table I.

TABLE I

Effect of polymer structure on triboelectric charging at about 30% relative humidity.

| Example | Polymer | 250 micron nickel carrier charge (nanocoulombs/gram) |
|---|---|---|
| 1 | [a] | −2.5 |
| 2 | $R=NO_2$ [b] | −1.4 |
| 2 | R=Cl [c] | −1.9 |
| 2 | R=H [d] | −1.5 |
| 2 | $R=OCH_3$ [e] | −1.9 |
| 3 | [f] | −1.6 |
| 4 | $R=NO_2$ | +1.2 |
| 4 | $R=OCH_3$ | 0.7 |

[a] 28 mole % of ester groups of copolymer of styrene-n-butyl methacrylate aminolyzed
[b] 60 mole % of available OH groups esterified
[c] 100 mole % of available OH groups esterified
[d] 90 mole % of available OH groups esterified
[e] 85 mole % of available OH groups esterified
[f] 2.3 mole % of ester groups aminolyzed, some crosslinking

EXAMPLE V

A sample of about 100 grams of 250 micron steel beads was continuously extracted with tetrahydrofuran for about 24 hours to remove soluble organics from their surface. The beads were then vigorously stirred mechanically in tetrahydrofuran for about 20 hours. The solvent and suspended rust particles were decanted. Fresh tetrahydrofuran was shaken with the beads and decanted. This was repeated until no further rust was evident in the decantate. The beads were dried in vacuo.

A solution of about 0.14 grams of polymer of Example I in about 125 ml. tetrahydrofuran was added to about 50.0 grams of the cleaned beads. The solvent was removed on a rotary evaporator at room temperature under vacuum.

The coated carrier beads which did not pass through a 177 micron sieve were then used in a cascade triboelectric charging test. The triboelectric value obtained by cascading the coated carrier beads against a film of the untreated styrene-n-butyl methacrylate copolymer was found to be about +1.2 nanocoulombs per gram after correction for background charge of the beads. Uncoated carrier beads developed a triboelectric charge of about −0.30 nanocoulombs per gram against the same film under the same test conditions. Thus, the triboelectric charge on the carrier beads developed against the film changed sign from positive to negative by coating the beads as described.

EXAMPLE VI

A hydroxy functionalized styrene-n-butyl methacrylate copolymer containing about 0.5 percent by weight of tolylene — 2,4 - diisocyanate which had been blocked with acetone oxime was coated onto steel carrier beads at a coating weight of about 0.22 percent by weight based on the weight of the beads. A portion of the beads were heated at 190° C for 0.5 hour to release the diisocyanate and cause crosslinking. In triboelectric response measurements against a film of the non-functionalized styrene-methacrylate copolymer, the beads coated with the crosslinked polymer acquired a triboelectric charge of about +0.15 nanocoulombs per gram. By comparison, beads coated with the uncrosslinked copolymer and measured against the film of untreated styrene-methacrylate copolymer acquired a triboelectric charge of about +1.2 nanocoulombs per gram. Versus a film of the hydroxy functionalized styrene-methacrylate copolymer, the triboelectric charge acquired by the uncrosslinked coated beads and the crosslinked coated beads was about +0.76 and −0.52 nanocoulombs per gram respectively. Thus a relatively large change in triboelectric charging properties was observed against both films; in both cases the beads with crosslinked coating accepted less positive charge.

EXAMPLE VII

Films of commercially available poly(vinyl alcohol), poly(vinyl hydrogen phthalate), and poly(vinyl acetate) were cast from solution onto aluminum plates and thoroughly dried. The poly(vinyl alcohol) film caused 250 micron steel beads to acquire a charge of about −0.28 nanocoulombs per gram. The poly(vinyl hydrogen phthalate) film led to about +3.7 nanocoulombs per gram charge on the 250 micron steel beads. The poly(vinyl acetate) film led to the acquisition of about −0.18 nanocoulombs per gram charge on the 250 micron steel beads. The acylation of the hydroxyl functions of the alcohol caused a substantial decrease in positive charging propensity, an increase in negative charging capacity.

EXAMPLE VIII

A mixture of about 4.45 grams of ethyl cellulose (0.52 hydroxyl units per anhydroglucose unit), about 1.25 grams of phenyl isocyanate and about 80 ml benzene was refluxed for about 1 hr. The solvent was removed in vacuo. The residue was thrice precipitated from tetrahydrofuran solution into water and dried in vacuo. Elemental analysis showed that about 55 % of the available hydroxyls had been converted to urethane units. Films of the starting material and product were cast from solution onto aluminum plates and thoroughly dried. The starting hydroxy material caused 250 micron nickel shot to acquire a charge of about +0.43 nanocoulombs per gram, while the product urethane gave the beads a charge of about +1.0 nanocoulombs per gram.

Conversion of the hydroxyl moieties to urethane functions led to a significant increase in the negative charging capacity of the cellulose.

Allthough specific components, proportions and procedures have been stated in the above description of the preferred embodiments of the novel toner compositions, other suitable components, proportions and procedures as listed above may be used with similar results. Further, other materials and procedures may be employed to synergize, enhance or otherwise modify the novel system.

Other modifications and ramifications of the present invention will appear to those skilled in the art upon a reading of this disclosure. These are intended to be included within the scope of this invention.

What is claimed is:

1. An electrostatographic carrier composition for use in developing electrostatic latent images on a recording surface, said carrier composition comprising carrier particles having an average particle diameter between about 50 microns and about 1,000 microns, each of said carrier particles comprising a core surrounded by from about 0.1 percent to about 10.0 percent by weight based on the weight of said carrier particles of an outer coating of a polymer selected from the group consisting of styrene-alkylmethacrylate and styrene-alkylacrylate containing pendant hydroxyl and amino moieties, said polymer having been exposed to systematic chemical modification of the pendant hydroxyl and amino moieties of said polymer by acylation to provide carrier particles characterized as having controlled triboelectric charging properties.

2. An electrostatographic carrier composition in accordance with claim 1 wherein said coating comprises from about 0.1 percent to about 1.0 percent by weight based on the weight of said carrier particles.

3. An electrostatographic carrier composition in accordance with claim 1 wherein said systematic chemical modification of said polymer has been controlled stoichiometrically so as to provide said controlled triboelectric charging properties to said carrier particles.

4. An electro-statographic carrier composition in accordance with claim 1 wherein said systematic chemical modification of said polymer has been controlled kinetically so as to provide said controlled triboelectric charging properties to said carrier particles.

5. An electrostatographic carrier composition in accordance with claim 1 wherein said triboelectric charging properties of said carrier particles have been controlled by the amount and type of acylating agent employed in said acylation.

6. An electrostatographic carrier composition in accordance with claim 1 wherein said polymer has been crosslinked by reaction of said pendant hydroxyl and amino moieties with a crosslinking agent.

* * * * *